United States Patent [19]

Wilson, Jr. et al.

[11] 3,852,350

[45] Dec. 3, 1974

[54] PROCESS OF PREPARING AMIDES

[75] Inventors: Farris H. Wilson, Jr., Cuyahoga Falls; Thomas J. Slam, Parma, both of Ohio

[73] Assignee: The Goodyear Tire & Rubber Company, Akron, Ohio

[22] Filed: Sept. 5, 1972

[21] Appl. No.: 286,476

[52] U.S. Cl....... 260/562 P, 260/471 R, 260/488 R, 260/518 R, 260/557 R, 260/558 P, 260/559 R
[51] Int. Cl............................................ C07c 103/44
[58] Field of Search .......... 260/557, 558, 559, 562, 260/561, 471, 488, 518

[56] References Cited
UNITED STATES PATENTS
3,658,769   4/1972   Kline.................................. 260/78

Primary Examiner—Harry I. Moatz
Attorney, Agent, or Firm—F. W. Brunner; J. A. Rozmajzl

[57] ABSTRACT

Amides are prepared by reacting an aromatic amine with an acid chloride in the presence of a neutralizing agent and a catalytic amount of a strongly basic tertiary amine; for example, N-(4-anilinophenyl) methacrylamide prepared by reacting p-aminodiphenylamine with methacryloyl chloride in the presence of sodium carbonate and triethylamine.

11 Claims, No Drawings

PROCESS OF PREPARING AMIDES

This invention relates to a process of preparing amides by reacting an aromatic amine with an acid chloride. More particularly it relates to a catalyst system for preparing said amides.

It is known to prepare amides by reacting an aromatic amine with an acid chloride in the presence of an acid absorbing agent which may be an inorganic salt such as sodium carbonate or an organic tertiary amine such as triethylamine. In this respect see U.S. Pat. No. 3,658,769, column 3, lines 65 to 68. The acid absorbing agent is added in an amount sufficient to neutralize the acid formed from the reaction between the aromatic amine and acid chloride, thus driving the reaction in the direction of amide formation. Certain inorganic salts are often chosen as the acid absorbing agent because of their inexpensiveness due to their ready avilability and ease of manufacture, as well as their ability to be easily separated from the amide product when the reaction is completed. Although the use of these inorganic salts results in reasonable reaction rates, yields and purities, it is desirable that reaction rates, yields and/or purities be improved as much as possible.

It is an object of the present invention to provide a process for preparing amide compounds. It is a further object of the present invention to provide a catalyst system for the preparation of amide compounds which will result in increased reaction rates and/or increased yields and/or increased purities. Other objects will be apparent from the subsequent discussion herein.

The above objects are accomplished by a process comprising reacting an aromatic amine and an acid chloride in the presence of a neutralizing agent and a catalytic amount of a strongly basic tertiary amine.

The amides which can be made by the present process are compounds such as those described in U.S. Pat. No. 3,658,769, and are made according to the process described therein with the exceptions described herein. The only amides taught by Kline whose preparation is excluded from the process of the present invention are those where $R^2$ is the radical

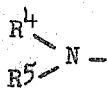

(see column 2, lines 7–10). The entire disclosure of said patent is incorporated herein by reference. The present catalytic system is also used in the preparation of compounds similar to those described in the aforementioned patent, but where the amine group adjacent to the carbonyl group in the structural formula for the amide in column 1, lines 65 to 70, has the structure —$NR^{18}$—, wherein $R^{18}$ is selected from the group consisting of alkyl radicals having 1 to 12 carbon atoms, (e.g., propyl, hexyl, heptyl and octyl) cycloalkyl radicals having 5 to 12 carbon atoms (e.g., cyclohexyl) and aralkyl radicals having 7 to 13 carbon atoms, (e.g., benzyl, α-phenethyl and β-phenethyl). Such compounds are prepared from amines of the structure in the aforementioned patent shown in column 3 at lines 53 to 58 wherein one of the hydrogens on the $NH_2$ radical is replaced by an appropriate $R^{18}$ group.

The aromatic amine reactant, neutralizing agent, and strongly basic tertiary amine catalyst are combined in an aprotic solvent, the aromatic amine and catalyst being dissolved therein. Preferably the aromatic amine is first dissolved in the solvent followed by the addition of the tertiary amine and then the addition of the neutralizing agent. The neutralizing agent is added using at least one molar equivalent of neutralizing agent per mole of aromatic amine and generally 1.5 to 2 molar equivalents or higher. At least one mol of acid chloride per mol of aromatic amine is then added (generally a 5 percent to 10 percent excess) slowly. The mixture is stirred until the reaction is essentially complete. The inorganic solids are filtered off. In some cases the product separates with the inorganics and can be recovered by slurrying the filter cake with water and refiltering. In other cases the product is soluble and can be recovered by techniques such as crystallization or distillation of the solvent. Efficient stirring is normally necessary for good reaction rates and yield, since the mixture normally thickens up during the reaction.

The acid chloride addition temperature is always below 50° C. and is normally 25° C. or less. The addition temperature is dependent upon the reactants, catalyst, and neutralizer being used, but is believed to be primarily dependent upon the acid chloride. A standard approach in obtaining improvements by using the amine catalyst would be to first add the acid chloride at 25° C. and then alter the temperature if necessary to obtain improvement over a non-catalyzed system or to obtain optimum results. If the results are not satisfactory at 25° C. the temperature should be lowered. For example, when acryloyl chloride was used, it was necessary to lower the temperature below 25° C. Acid chloride addition temperatures, therefore, to obtain improvements or optimum results can be routinely determined by one of ordinary skill in the art.

The reaction medium after the acid chloride addition is complete, is held at a temperature normally below 50° C. The holding temperature can sometimes be raised above 50° C., but normally the reaction will not benefit from the use of higher temperatures. In fact, higher temperatures can sometimes result in poorer product color. With some reactants yield or purity will be adversely affected if the temperature is raised much above the acid chloride addition temperature. In such cases it is necessary to hold the reaction medium close to the addition temperature for a substantial portion of the reaction, sometimes until the reaction is substantially complete.

The adverse effects of higher temperatures are probably due to undesirable side reactions which are favored by high temperatures. Again, optimum holding temperatures necessary for improvement or optimum results can be routinely determined by one of ordinary skill in the art.

Where methacryloyl chloride is used, particularly with p-aminodiphenylamine, addition temperature should be 25° C. to 30° C. or less and preferably above 0° C. It is normally satisfactory, though not necessary, to then raise the reaction temperature to temperatures as high as 45° C. or 50° C. or above.

When acryloyl chloride is added, particularly to p-aminodiphenylamine, the addition temperature should be 15° C. or less and normally not less than −10° C. With acryloyl chloride it is preferred that the reaction temperature should be kept in the addition temperature range until the reaction is substantially complete.

A standard addition time is from 15 minutes to an hour and longer, although the addition time will vary depending upon various factors including the size of equipment, the type of agitation, and addition temperature.

The acid chloride is preferably not diluted with the aprotic solvent. When it is diluted with a solvent, a decrease in yields and purities will often result.

The use of the tertiary amine catalyst will normally result in a higher reaction rate. It will also often result in increased product yields and purities. This is particularly the case where the aromatic amine reactant contains small amounts of impurities, which are believed to be oxidized forms of the amines. Commercial p-aminodiphenylamine, for example, is believed to contain such impurities. When it is used to prepare amides by reaction with an acid chloride in the presence of a neutralizing agent, as defined herein, inferior yields and purities are obtained unless the tertiary amine catalyst of the present invention is used. However, where p-aminodiphenylamine is distilled to a very high purity, high yields and purities are obtained even without a tertiary amine catalyst. Even with highly pure aromatic amine, however, reaction rates are increased by the addition of a catalytic amount of the tertiary amine catalyst.

An advantage of the present invention is that by using a neutralizing agent, low amounts of a tertiary amine catalyst can be used and need not be recovered because of the low levels used.

The aromatic amine reactants where $R^{18}$ is hydrogen and amides prepared therefrom, are illustrated in U.S. Pat. No. 3,658,769. Aromatic amine reactants where $R^{18}$ is other than hydrogen are illustrated by the following.

N-isopropyl-N'-phenyl-p-phenylenediamine
N-1,3-dimethylbutyl-N'-phenyl-p-phenylenediamine
N-1,4-dimethylpentyl-N'-phenyl-p-phenylenediamine
N-1-methylheptyl-N'-phenyl-p-phenylenediamine
N-cyclohexyl-N'-phenyl-p-phenylenediamine
N-benzyl-N'-phenyl-p-phenylenediamine
N-sec.butyl-N'-p-tolyl-p-phenylenediamine Amides produced from aromatic amines where $R^{18}$ is other than hydrogen are illustrated by the following.
N-isopropyl-N-p-anilinophenyl acrylamide
N-isopropyl-N-p-anilinophenyl methacrylamide
N-1,3-dimethylbutyl-N-p-anilinophenyl acrylamide
N-1,3-dimethylbutyl-N-p-anilinophenyl methacrylamide
N-1,4-dimethylpentyl-N-p-anilinophenyl acrylamide
N-1,4-dimethylpentyl-N-p-anilinophenyl methacrylamide
N-1-methylheptyl-N-p-anilinophenyl acrylamide
N-1-methylheptyl-N-p-anilinophenyl methacrylamide
N-cyclohexyl-N-p-anilinophenyl acrylamide
N-cyclohexyl-N-p-anilinophenyl methacrylamide
N-benzyl-N-p-anilinophenyl acrylamide
N-benzyl-N-p-anilinophenyl methacrylamide
N-sec.butyl-N-p-(p-toluino)phenyl acrylamide
N-sec.butyl-N-p-(p-toluino)phenyl methacrylamide The acyl chloride reactants are illustrated in U.S. Pat. No. 3,658,769.

The aromatic amine reactants of the present invention where $R^{18}$ is hydrogen may be prepared by reduction of the corresponding nitro compound. Where $R^{18}$ is other than hydrogen, the corresponding amines may be reductively alkylated with aldehydes and ketones or reacted with halogen compounds.

The acid chlorides of the present invention may be prepared by reaction of the acid with thionyl chloride, phosphorus trichloride or phosphorus pentachloride.

The present invention can be run continuously or in a batch fashion.

Neutralizing agents are well known in the art and are inorganic materials capable of reacting with the acid formed by the reaction between the aromatic amine and acid chloride, thereby removing the acid from the system. These compounds are represented by inorganic hydroxides, carbonates, bicarbonates and oxides, wherein the anion includes sodium, potassium, barium, calcium, lithium, cesium and magnesium. Specific inorganic salts include compounds such as $Na_2CO_3$, $NaOH$, $NaHCO_3$, $K_2CO_3$, $KOH$, $KHCO_3$, $Ca(OH)_2$, $CaO$, $CaCO_3$, $Ba(OH)_2$, $BaCO_3$, $LiOH$, $Li_2CO_3$, $LiHCO_3$, $MgCO_3$, $Mg(OH)_2$ and $Mg(HCO_3)_2$. Sodium carbonate is preferred. The neutralizing agent is used in an amount normally in excess of that theoretically necessary (i.e., in excess of a molar equivalent) to neutralize the acid formed during the aforementioned reaction.

The strongly basic tertiary amine has the following structural formula:

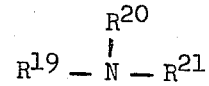

wherein $R^{19}$ and $R^{20}$ are selected from the group consisting of alkyl radicals having 1 to 12 carbon atoms (e.g., methyl, ethyl), cycloalkyl radicals having 5 to 10 carbon atoms (e.g., cyclohexyl), aralkyl radicals having 7 to 15 carbon atoms (e.g., benzyl), hydroxy alkyl radicals having 2 to 12 carbon atoms (e.g., hydroxyisopropyl), and hydroxy cycloalkyl radicals having 5 to 10 carbon atoms (e.g., hydroxy cyclohexyl). $R^{21}$ can be the same as $R^{19}$ and $R^{20}$ and in addition may be an aryl radical having 6 to 12 carbon atoms (e.g., phenyl) or a radical having the following structure:

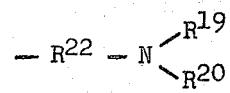

wherein $R^{22}$ is an alkylene radical having 1 to 6 carbon atoms (e.g., ethylene), a cycloalkylene radical having 5 to 10 carbon atoms (e.g., cyclohexylene) or an arylene radical having 6 to 12 carbon atoms (e.g., phenylene). Further, any two of the three radicals $R^{19}$, $R^{20}$ and $R^{21}$ may be combined to form a heterocyclic ring such as pyrollidine, piperidine, and dimethyl pyrollidine and, in fact, all three radicals can be combined to form an aromatic ring such as pyridine or picoline.

Illustrative of tertiary amines that can be used as catalysts are the following.
N,N-dimethylaniline
Triisopropanol amine
Triethyl amine
N,N,N',N'-tetramethylethylenediamine Pyridine
N,N-diethylaniline
2-(N-ethylanilino) ethanol
2-(N-methylanilino) ethanol
Triethanol amine
N,N-dimethylcyclohexylamine
Picoline
N-methyl pyrrolidine Preferred tertiary amines are N,N-dimethylaniline, triisopropanol amine, N,N,N',N'-tetramethylethylenediamine and triethylamine. N,N'-dimethylaniline is particularly preferred where methacryloyl chloride is used and triisopropanol amine is particularly preferred where acryloyl chloride is used.

The tertiary amines of the present invention can generally be prepared by the reaction of ammonia, primary or secondary amines with organic halides or alcohols.

The strongly basic tertiary amine is used in a catalytic amount. The level will normally vary from 0.0033 to 0.04 mole of the amine catalyst per mole of aromatic amine reactant, although it can be used in amounts up to 0.20 mole per mole of aromatic amine and higher. Preferably at least 0.01 mole is used. Normally, however, further improvements in yield, purity and/or reaction rate are slight to nil after the 0.04 mole level is reached. That is, there is a point where the tertiary amine behaves primarily as an acid acceptor, as it is known in the prior art, and less as a catalyst.

Some of the following examples illustrate the practice of the present invention. Those which do are not intended to limit, but only to illustrate the practice of the present invention.

EXAMPLE 1

92 grams of p-aminodiphenylamine and 1000 milliliters of toluene were charged to a two-liter flask equipped with stirrer, thermometer, dropping funnel and reflux condenser. The mixture was heated to 40° C. to form a solution. 80 grams of sodium carbonate were added. The slurry was cooled to 25° C. and 58 grams of methacryloyl chloride were added in 13 minutes with the temperature dropping to 17° C. The reaction medium was warmed to 45° C. and held for 2.5 hours. The medium was cooled to 8° C. and the solid filtered off. The solid was allowed to dry and washed with water in a blender, filtered off and dried. The product was purple in color, weighed 74 grams and possessed a melting point of 92°–98° C.

EXAMPLE 2

The charging was as in Example 1, except that one gram of triethylamine was added along with the carbonate. It was cooled to 25° C. and 58 grams of methacryloyl chloride was added in 25 minutes with a maximum temperature during addition of 25° C. It was warmed to 45° C. and held 1.5 hours. After cooling to 8° C., the solid was filtered off, sucked dry and washed with petroleum ether. After drying it was washed with water and redryed. The product was light grey in color, weighed 112 grams and possessed a melting point of 103°–105.5° C.

Example 1 describes a process outside the scope of the present invention, while Example 2 describes a process within the practice of the present invention. Both processes involve the preparation of N-(4-anilinophenyl) methacrylamide.

In Example 2, with the triethylamine (TEA), a crude yield of 89 percent was obtained with a holding time of 1.5 hours. In Example 1, without the TEA, a crude yield of about 59 percent was obtained in 2.5 hours. The purity of the product of Example 2 was greater than that of the product of Example 1 as indicated by the narrower melting point range.

Examples 4 to 9 illustrate the use of various tertiary amine catalysts in the preparation of N-(anilinophenyl) methacrylamide from p-aminodiphenylamine and methacryloyl chloride. These examples were run in a manner similar to Example 2 in one liter of toluene using 80 grams of sodium carbonate. After the methacryloyl chloride (MAC) addition, the reactions were carried out for 135 minutes at 25° C. Example 3 is another run without a tertiary amine catalyst. Its holding period was 225 minutes at 25° C. In each example, after the holding period, the reaction mixture was cooled to 5° C. to 10° C., filtered, the product dried, washed with hexane, dried, slurried with water, dried and the melting point determined.

| Ex. | Amine Catalyst (grams) | Addition Time/Temp. (min)/(°C) | Holding Time/Temp. (hrs)/(°C) | Crude Yield (%) | Melting Point (°C) | Purity (%) |
|---|---|---|---|---|---|---|
| 3 | — | 50/25 | 3.75/25 | 77 | 49–75 | 60.6 |
| 4 | TEA (1.0) | 25/25 | 1.5/45 | 89 | 103–105.5 | 97.0 |
| 5 | TIPA (1.9) | 37/25 | 2.25/25 | 77 | 74–80 | 72.4 |
| 6 | Pyridine (0.8) | 33/25 | 2.25/25 | 82 | 83–86 | 80.0 |
| 7 | TMEDA (1.2) | 36/25 | 2.25/25 | 91 | 103.5–105 | 97.5 |
| 8 | DEA (1.5) | 30/25 | 3/25 | 84 | 70–87 | 75.0 |
| 9 | DMA (0.6) | 30/25 | 2.25/25 | 96 | 105–106.5 | 96.5 |

TEA - triethylamine
TIPA - triisopropanolamine
TMEDA - N,N,N',N'tetramethylethylenediamine
DEA - N,N-diethylaniline
DMA - N,N-dimethylaniline The p-aminodiphenylamine used in all of the working examples 1 to 9 was of a commercial grade and contained impurities. As noted in the Examples, where a catalyst was used, reaction rates, yields and purities increased.

The following reactions were run in a manner similar to that described in the previous examples. N-1,3-dimethylbutyl-N'-phenyl-p-phenylenediamine was reacted with methacryloyl chloride to form N-1,3-dimethylbutyl-N-p-anilinophenylmethacrylamide (Example 10) and acryloyl chloride to form N-1,3-dimethylbutyl-N-p-anilinophenyl-acrylamide (Example 11). In Example 12 p-aminodiphenylamine was reacted with acryloyl chloride to form N-p-anilinophenylacrylamide. Unless noted otherwise sodium carbonate (about 3 moles to one mole of amine reactant) was used as the neutralizer. All of the reactions were run with and without an amine catalyst.

| Ex. | Catalyst | Mole Catalyst Mole Amine | Addition Time/Temp. (min)/(°C) | Holding Time/Temp. (hrs)/(°C) | Relative Yield (1) |
| --- | --- | --- | --- | --- | --- |
| 10 | TEA | 0.02 | 30/25 | 5/40 | 58.4 |
| | | | | 16/40 | 82.3 |
| | none | — | 30/25 | 5/40 | 54.7 |
| | | | | 16/40 | 54.7 |
| 11 | TIPA | 0.026 | 30/0 | 5/0 | 92.3 |
| | none | — | 30/0 | 5/0 | 69.9 |
| | TIPA* | 0.026 | 30/0 | 5/0 | 81.2 |
| 12 | TIPA | 0.026 | 50/0 | 1.5/0 | 90.0 |
| | | | | 2.5/0 | 88.1 |
| | none | — | 50/0 | 1.5/0 | 63.8 |
| | | | | 2.5/0 | 83.3 |

(1) An area percent chromatographic analysis was used to determine the relative yield of pure product.
* Potassium carbonate substituted for sodium carbonate.

The above data indicate that various reactions benefit by the use of the catalysts of the present invention. It also indictes that neutralizers other than sodium carbonate can be used, although sodium carbonate is preferred. In this respect, the neutralizer should be in a finely divided form. In earlier work a coarser potassium carbonate was used with poor results.

In most of the previous examples a nitrogen atmosphere was used. In the remaining examples, the reactions were open to the atmosphere. An inert atmosphere helps to maintain good product color.

All of the products prepared by the process of the present invention can be used as antioxidants in oxidizable polymers.

While certain representative embodiments and details have been shown for the purpose of illustrating the invention, it will be apparent to those skilled in this art that various changes and modifications may be made therein without departing from the spirit or scope of the invention.

What is claimed is:

1. A process of preparing an amide by reacting an aromatic amine with an acid chloride in an aprotic solvent solution thereof in the presence of an inorganic neutralizing agent and a catalytic amount of a tertiary amine, wherein the aromatic amine, neutralizing agent and tertiary amine are combined in the aprotic solvent, said combination then being combined with the acid chloride at a temperature of less than 50° C., and the reaction occurring at a temperature of less than 50° C., wherein at least one mole equivalent of the neutralizing agent is used per mole of aromatic amine and wherein the catalytic amount of the tertiary amine is 0.0033 mole to 0.20 mole per mole of aromatic amine and wherein the aromatic amine has the following structural formula

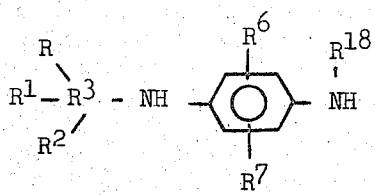

and the acid chloride has the following structural formula

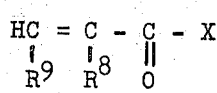

wherein $R^3$ is an aryl radical, $R$ and $R^1$ are selected from the group consisting of hydrogen, alkyl radicals having from 1 to 4 carbon atoms and alkoxy radicals having from 1 to 4 carbon atoms, $R^2$ is selected from the group consisting of hydrogen, alkyl radicals having from 1 to 4 carbon atoms and alkoxy radicals having from 1 to 4 carbon atoms and wherein $R^6$ and $R^7$ are selected from the group consisting of hydrogen and alkyl radicals having from 1 to 4 carbon atoms, $R^8$ is selected from the group consisting of hydrogen, alkyl radicals having from 1 to 4 carbon atoms, aryl radicals having from 6 to 12 carbon atoms, aralkyl radicals having from 7 to 13 carbon atoms, cycloalkyl radicals having from 5 to 12 carbon atoms, carboxymethyl radical and carbalkoxymethyl radicals, and $R^9$ is selected from the group consisting of hydrogen, alkyl radicals having from 1 to 4 carbon atoms, aryl radicals having from 6 to 12 carbon atoms, cycloalkyl radicals having from 5 to 12 carbon atoms, carboxyl radical and carbalkoxy radicals and wherein $R^{18}$ is selected from the group consisting of hydrogen, alkyl radicals having 1 to 12 carbon atoms, cycloalkyl radicals having 5 to 12 carbon atoms and aralkyl radicals having 7 to 13 carbon atoms and wherein the tertiary amine has the following structural formula

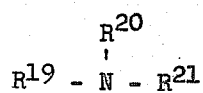

wherein $R^{19}$ and $R^{20}$ are selected from the group consisting of alkyl radicals having 1 to 12 carbon atoms, cycloalkyl radicals having 5 to 10 carbon atoms, aralkyl radicals having 7 to 15 carbon atoms, hydroxy alkyl radicals having 2 to 12 carbon atoms, and hydroxy cycloalkyl radicals having 5 to 10 carbon atoms, and wherein $R^{21}$ can be selected from the same group of radicals as $R^{19}$ and $R^{20}$ and in addition can be an aryl radical having 6 to 12 carbon atoms or a radical having the following structure

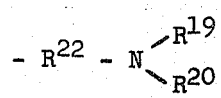

wherein $R^{22}$ is selected from the group consisting of alkylene radicals having 1 to 6 carbon atoms, cycloalkylene radicals having 5 to 10 carbon atoms, and arylene radicals having 6 to 12 carbon atoms and wherein any two of the three radicals $R^{19}$, $R^{20}$ and $R^{21}$ can be combined to form a heterocyclic ring and wherein $R^{19}$, $R^{20}$ and $R^{21}$ can be combined to form an aromatic ring and wherein the inorganic neutralizer is selected from the group consisting of hydroxides, carbonates, bicarbonates and oxides, the anionic portion thereof being selected from the group consisting of sodium, potassium, barium, calcium, lithium, cesium and magnesium.

2. The process according to claim 1 wherein at least one mole of acid chloride is added per mole of aromatic amine.

3. The process according to claim 2 wherein at least two molar equivalents of neutralizing agent are added per mole of aromatic amine.

4. The process according to claim 3 wherein the catalyst level is from 0.033 to 0.04 mole.

5. The process according to claim 3 wherein $R^{18}$ is hydrogen and $R^3$ is phenyl.

6. The process according to claim 3 wherein the tertiary amine is selected from the group consisting of N,N'-dimethylaniline, triisopropanol amine, N,N,N',N'-tetramethylethylenediamine and triethylamine.

7. The process according to claim 3 wherein the aromatic amine is p-aminodiphenyl amine and the acid chloride is selected from the group consisting of acryloyl chloride and methacryloyl chloride.

8. The process according to claim 7 wherein the neutralizing agent is sodium carbonate.

9. The process according to claim 8 wherein when the acid chloride is acryloyl chloride the tertiary amine is triisopropanol amine and when the acid chloride is methacryloyl chloride, the tertiary amine is N,N'-dimethylaniline.

10. The process according to claim 3 wherein the acid chloride is methacryloyl chloride, and is added at a temperature of from 0° C. to 30° C.

11. The process according to claim 3 wherein when the acid chloride is acryloyl chloride and is added at a temperature of −10° C. to 15° C. and held at −10° C. to 15° C. until the reaction is substantially complete.

* * * * *